US010262512B2

(12) United States Patent
Sundholm et al.

(10) Patent No.: US 10,262,512 B2
(45) Date of Patent: Apr. 16, 2019

(54) ARRANGEMENT AND METHOD FOR FITTING ROOMS

(71) Applicant: MARIELLA LABELS OY, Vantaa (FI)

(72) Inventors: Göran Sundholm, Tuusula (FI); Minna Arra, Helsinki (FI); Jenni Virnes, Helsinki (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 15/523,804

(22) PCT Filed: Oct. 27, 2015

(86) PCT No.: PCT/FI2015/050734
§ 371 (c)(1),
(2) Date: May 2, 2017

(87) PCT Pub. No.: WO2016/071562
PCT Pub. Date: May 12, 2016

(65) Prior Publication Data
US 2017/0316665 A1    Nov. 2, 2017

(30) Foreign Application Priority Data

Nov. 7, 2014  (FI) .................................. 20145979
May 27, 2015  (FI) .................................. 20155398

(51) Int. Cl.
*G08B 13/14* (2006.01)
*G08B 13/24* (2006.01)
(Continued)

(52) U.S. Cl.
CPC .............. *G08B 13/248* (2013.01); *E04H 1/12* (2013.01); *E04H 1/1266* (2013.01); *G01V 3/08* (2013.01);
(Continued)

(58) Field of Classification Search
CPC .............. G08B 13/248; G08B 13/2485; G08B 13/2417; G06K 19/0702; G06K 19/07722; G06K 7/10415; G01V 3/08; E04H 1/1266
(Continued)

(56) References Cited

U.S. PATENT DOCUMENTS 6,313,745 B1   11/2001  Suzuki
7,123,146 B1   10/2006  Holzman
(Continued)

FOREIGN PATENT DOCUMENTS

DE   102 47 859 A1   4/2004
JP   11-175857 A     7/1999
(Continued)

OTHER PUBLICATIONS

Finnish Search Report for Patent Application No. 20145979 dated Jun. 10, 2015.
(Continued)

*Primary Examiner* — Tanmay Shah
(74) *Attorney, Agent, or Firm* — Birch, Stewart, Kolasch & Birch, LLP

(57) ABSTRACT

An arrangement and method for fitting rooms and/or fitting areas. The arrangement includes detecting arrival, departure and/or presence of a person to/from a fitting room and/or fitting area and for detecting presence and/or number of remotely readable identification tags, electronic article surveillance tags and/or electronic price labels. The method includes detecting entrance or presence of a person to a fitting room and/or fitting area, detecting presence and/or number of remotely readable identification tags, electronic article surveillance tags and/or electronic price labels in the fitting room and/or fitting area after the entrance of a person to the fitting room and/or fitting area detecting departure of (Continued)

a person from a fitting room and/or fitting area and detecting presence and/or number of remotely readable identification tags, electronic article surveillance tags and/or electronic price labels in the fitting room and/or fitting area after departure of the person.

18 Claims, 5 Drawing Sheets

(51) Int. Cl.
| | |
|---|---|
| *E04H 1/12* | (2006.01) |
| *G06K 7/10* | (2006.01) |
| *G06K 19/077* | (2006.01) |
| *G01V 3/08* | (2006.01) |
| *G06K 19/07* | (2006.01) |
| *G06Q 10/08* | (2012.01) |
| *G06Q 30/06* | (2012.01) |

(52) U.S. Cl.
CPC ........... *G06K 7/10* (2013.01); *G06K 7/10415* (2013.01); *G06K 19/0702* (2013.01); *G06K 19/077* (2013.01); *G06K 19/07722* (2013.01); *G06Q 10/087* (2013.01); *G06Q 30/06* (2013.01); *G08B 13/2417* (2013.01); *G08B 13/2485* (2013.01)

(58) Field of Classification Search
USPC ...................................................... 340/572.4
See application file for complete search history.

(56) References Cited

U.S. PATENT DOCUMENTS

| | | |
|---|---|---|
| 2010/0265065 A1 | 10/2010 | Shimazaki |
| 2011/0072132 A1 | 3/2011 | Shafer et al. |

FOREIGN PATENT DOCUMENTS

| | | | | |
|---|---|---|---|---|
| JP | 11175857 A | * | 7/1999 | |
| JP | 2008-3761 A | | 1/2008 | |
| WO | WO 2013/169786 A2 | | 11/2013 | |
| WO | WO 2013169786 A2 | * | 11/2013 | ......... G08B 13/2417 |

OTHER PUBLICATIONS

Finnish Search Report for Patent Application No. 20155398 dated Nov. 6, 2015.
International Search Report for PCT/FI2015/050734 (PCT/ISA/210) dated Jan. 28, 2016.
Written Opinion of the International Searching Authority for PCT/FI2015/050734 (PCT/ISA/237) dated Jan. 28, 2016.

* cited by examiner

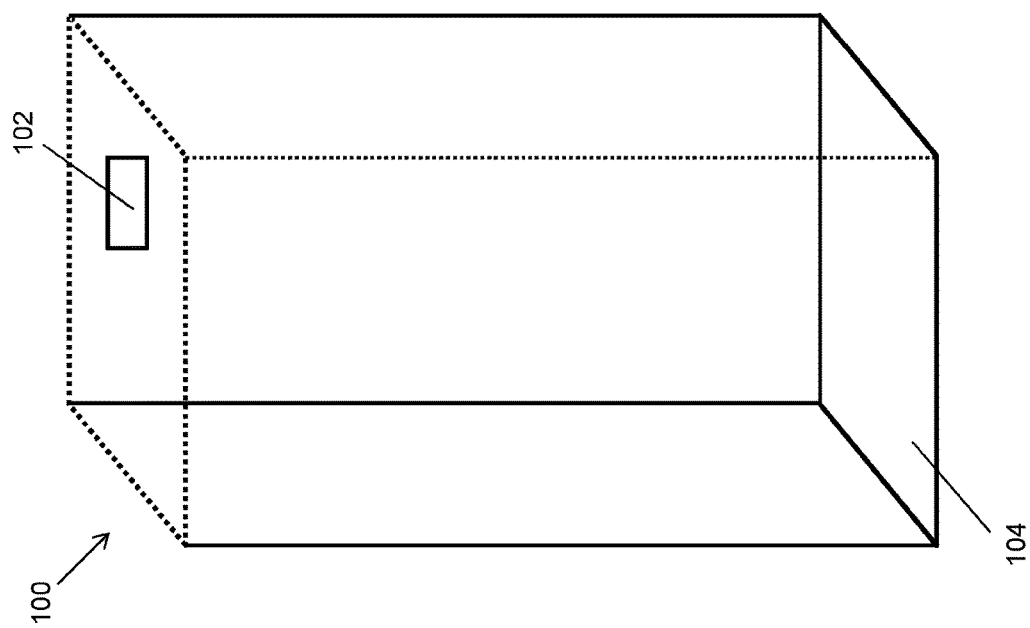

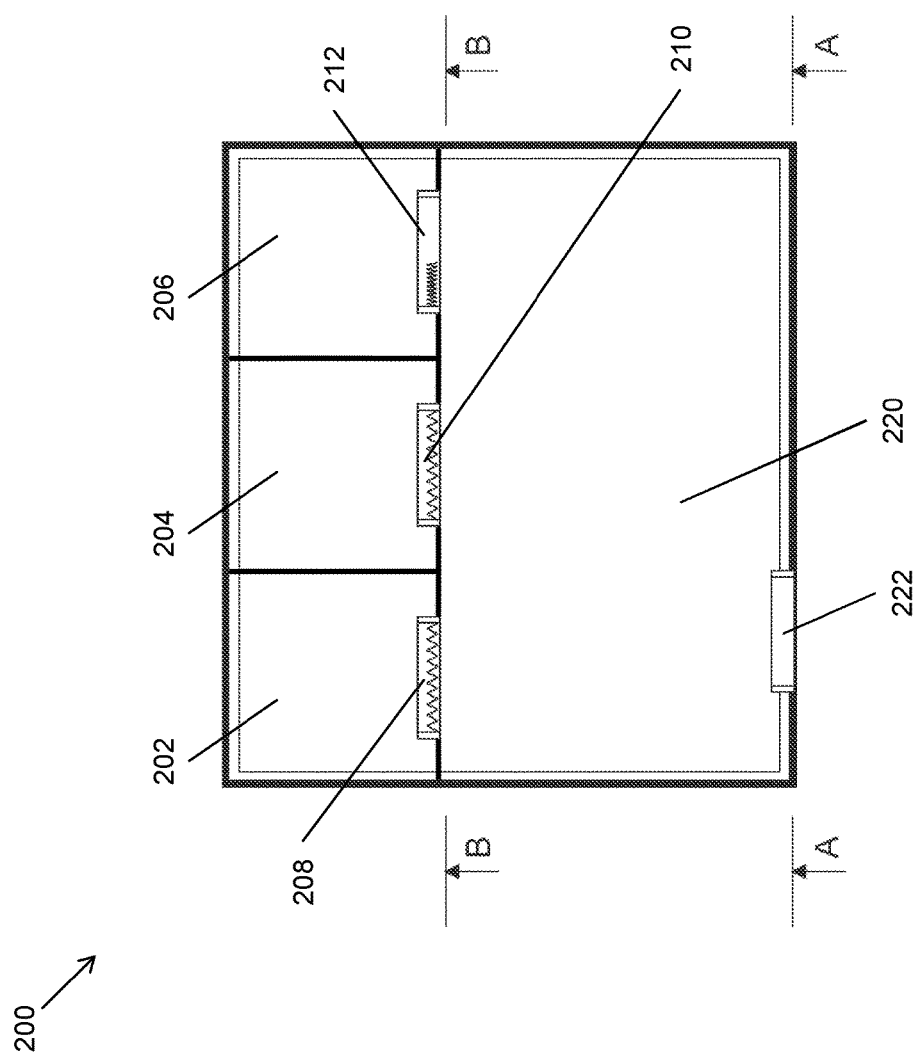

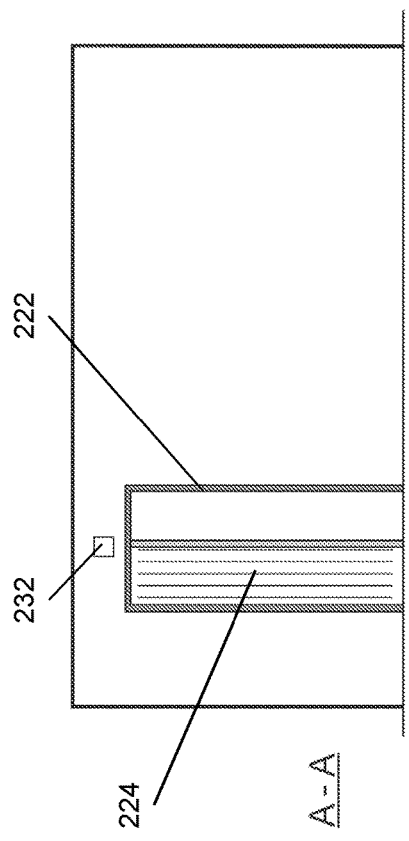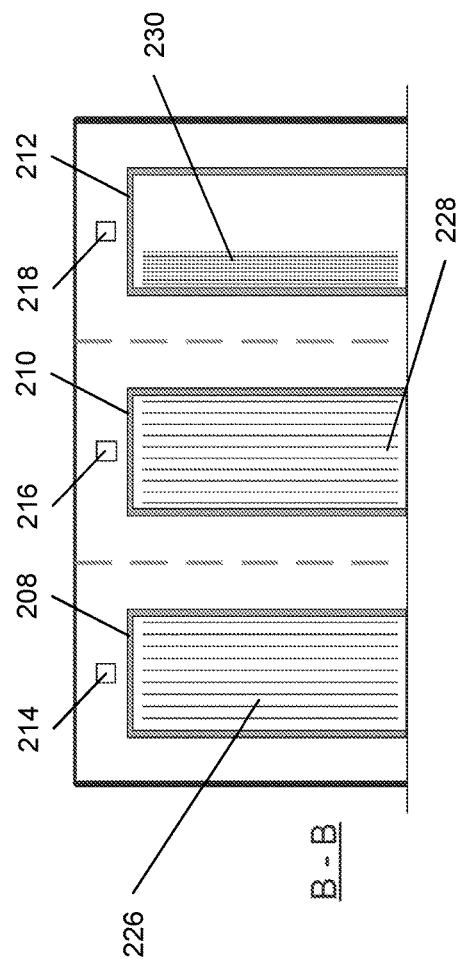

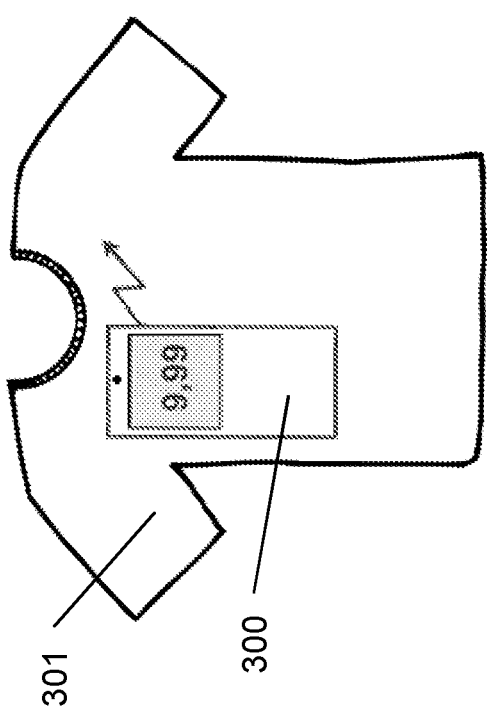

ARRANGEMENT AND METHOD FOR FITTING ROOMS

FIELD OF THE INVENTION

The invention relates to an arrangement and method for fitting rooms and dressing rooms. The invention also relates to electronic article surveillance systems and electronic price label systems.

BACKGROUND OF THE INVENTION

Conventionally, the product related information, such as price, is attached to products like clothes with hanging tags made of e.g. paper or similar material. This information can be attached to the product at the place of manufacturing or it can be later added to the product. At least when local information, local price or updated price is to be attached to the product this has to be done manually in the store. The new prices are printed out on paper or a corresponding material, and these pieces with their new price markings are attached manually to existing tags on the products. Thus, an employee must first find the correct product where the tag has to be updated and the new tag is attached in its position. A disadvantage in this arrangement is, among other things, the fact that the arrangement is very laborious and there is a high risk of mistakes. In case of a mistake, a situation may occur, in which the price information on the price tags on the product conflicts with the price information in the cash register system.

Also electronic price label systems, are known which offer automatic updating of prices to an electronic label that will facilitate and accelerate the updating of the price information to a significant extent. Electronic price label systems are systems used by retailers for displaying product pricing e.g. on shelves. Typically, electronic shelf labels are implemented as electronic display modules that are attached to the front edge of retail shelving. These modules use different technologies to show the current product price and also other information to the customer. A communication network allows the price display to be automatically updated whenever a product price is changed. This automated system reduces pricing management labor costs and improves pricing accuracy.

Electronic price label systems are particularly suitable for use in large shops or supermarkets that offer thousands or tens of thousands product items for sale, whose prices must be updated frequently and correctly.

The electronic price display modules can be updated from a centralized control system via wired or wireless communication. All-wired systems have obvious problems in terms of the layout limitations caused by complicated cabling due to the high number of individual electronic price label displays. Wireless systems have their major technological bottleneck in the need for individual power supplies for each electronic price label display unit and requirement for long power supply lifetime, i.e. operational lifetime for the batteries. In addition, the wireless systems need to be able to provide reliable communication channel in an environment that has high number of individual receiver-transmitter units that in order to prolong the battery life, need to operate with minimum transmitting power levels.

A display technology that is suitable for electronic price label applications is a so called Electronic Paper Display (EPD) that possesses a paper-like high contrast appearance, ultra-low power consumption, and a thin, light form. EPD's aim is to give the viewer the experience of reading from paper, while providing the capability to electronically update the displayed information. EPD's are technology enabled, as one possibility, by electronic ink. Such ink carries an electrical charge enabling it to be updated through electronics. Electronic ink is well suited for EPD's as it is a reflective technology which requires no front or backlight, is viewable under a wide range of lighting conditions, including direct sunlight, and requires no power to maintain an image. Electrical power is only consumed when the displayed data is changed. In order become widely applied in different type of applications, wireless electronic price labels or corresponding electronically controlled wireless displays are faced with a number of requirements that are partly dictated by the manufacturing process and partly by the end use, for example, the use, environment and manageability in a store by the store personnel.

WO0067110 discloses a display unit for electronic shelf price label system that utilizes electronic ink and EPD technology. The electronic display unit in WO0067110 features a printable electronic display comprising an encapsulated electrophoretic display medium. The resulting electronic display is flexible and has in large measure the applications of a printed display. Further, since the encapsulated electrophoretic display medium used in the present invention can be printed, the display itself can be made inexpensively. The encapsulated electrophoretic display medium is an optoelectronically active material which comprises at least two phases: an electrophoretic contrast media phase and a coating/binding phase. The electrophoretic display medium can form, for example, a full color, mufticolor, or two color (e. g. black and white) display. The electrophoretic phase comprises at least one species of encapsulated electrophoretic particles, having distinct physical and electrical characteristics, dispersed in a clear or dyed suspending fluid. The coating/binding phase includes a polymer matrix that surrounds the electrophoretic phase. In this embodiment, the polymer in the polymeric binder is capable of being dried, cross linked, or otherwise cured as in traditional inks, and therefore a printing process can be used to deposit the encapsulated electrophoretic display medium onto a substrate.

Also radio-frequency based electronic article surveillance systems are known which are used to prevent shoplifting from retail stores, pilferage of books from libraries or removal of properties from office buildings. Special tags are fixed to products and these tags are removed or deactivated by the personnel of the store when the item is properly bought or checked out. At the exits of the store, a detection system sounds an alarm or otherwise alerts the staff when it senses active tags.

Also fitting areas, fitting rooms or dressing rooms are known in the prior art. They are usually e.g. small single-user cubicles where a person may try on clothes or in case of fitting areas, bigger areas where there are plurality of fitting rooms. These can often be found at retail stores where one would want to try on clothes before purchasing them.

With the solutions of the prior art fitting rooms don't have any automatic electronic article surveillance systems for preventing shop lifting. With the systems of prior art someone from the personnel of the store is needed to manually monitor how many articles are taken in to the fitting room by examining the person when he/se enters the fitting room area and leaves the fitting room area. Also someone is needed to monitor how many articles are left to the fitting room after the person has left the fitting room.

SUMMARY OF THE INVENTION

It is an aim of the present invention to solve the above-mentioned problems and simultaneously provide an arrangement and method for a fitting room and dressing room by utilizing remotely readable identification tags, electronic article surveillance tags and/or electronic price labels.

The solution of the invention comprises means for detecting arrival, departure and/or presence of a person to/from a fitting room and means for detecting presence and/or number of remotely readable identification tags, electronic article surveillance tags and/or electronic price labels. In the solution of the invention following steps are performed: detecting entrance or presence of a person to a fitting room, detecting presence and/or number of remotely readable identification tags, electronic article surveillance tags and/or electronic price labels in the fitting room after the entrance of a person to the fitting room detecting departure of a person from a fitting room and detecting presence and/or number of remotely readable identification tags, electronic article surveillance tags and/or electronic price labels in the fitting room after departure of the person.

The advantage of the solution of the present invention is that it enables an automatic arrangement which monitors fitting rooms and/or fitting areas and helps to prevent shop lifting. With the arrangement of the present invention no-one is needed to manually monitor how many articles are taken in to the fitting room by examining the person when he/she enters the fitting room area and leaves the fitting room area. Also no-one is needed to monitor how many articles are left to the fitting room after the person has left the fitting room.

Another advantage of the invention is that it enables the collecting of information and data in respect to cloth fittings performed in fitting rooms. With the arrangement of the invention also information e.g. about the product or other suitable products can be presented to the person in the fitting room.

DESCRIPTION OF THE DRAWINGS

In the following, the invention will be described in more detail by means of an embodiment example with reference to the appended drawings, in which FIG. 1 presents a schematic and simplified view of an example arrangement for a fitting room according to the present invention, FIGS. 2 A-C present a schematic and simplified view of an example arrangement for a fitting area according to the present invention, FIG. 3 presents an example implementation of a product with an electronic price label and, FIG. 4 presents an example implementation of an electronic price label.

DETAILED DESCRIPTION OF THE INVENTION

Figure 4:
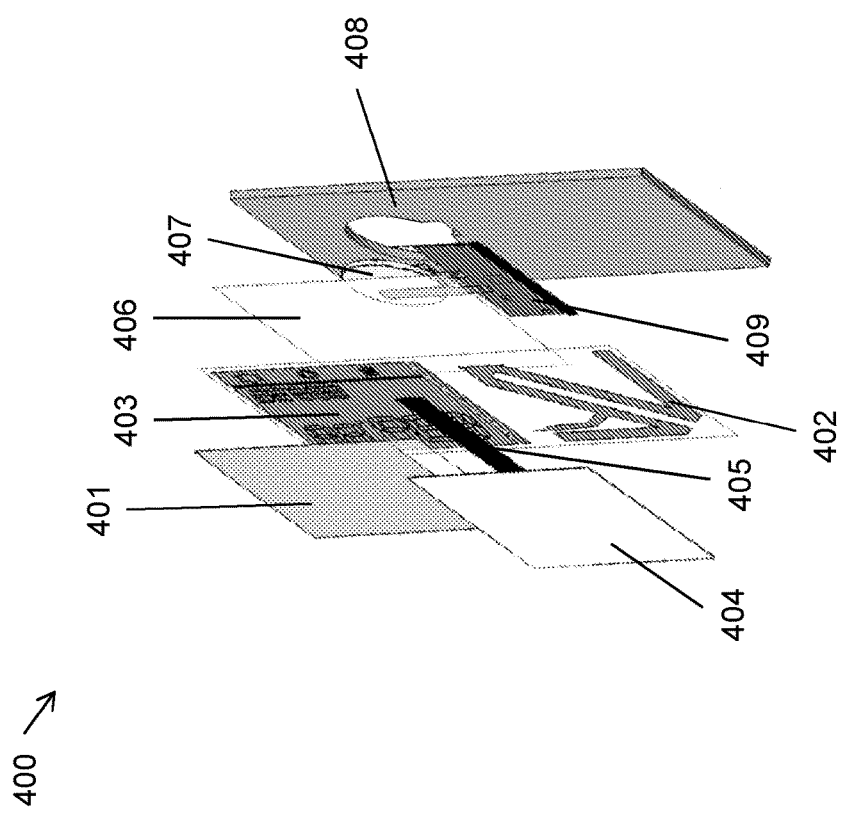

FIG. 1 presents schematically, as an example, an arrangement of an embodiment of the present invention.

An arrangement of the present invention can be arranged to a fitting area, such as fitting room or dressing room. The arrangement comprises means for detecting arrival, departure and/or presence of a person 104 to/from a fitting room 100 and means for detecting presence and/or number of remotely readable identification tags, electronic article surveillance tags and/or electronic price labels 102. The remotely readable identification tags, an electronic article surveillance tags and/or electronic price labels 102 can have unique identifiers or alternatively they can be identifiers which are not unique but their presence can be detected.

Detecting arrival, departure and/or presence of a person can be performed with motion detection or a planar sensor system installed e.g. on the floor of the fitting area. The sensor can be e.g. a planar sensor described in WO2005020171-publication. Detecting presence and/or number of remotely readable identification tag, electronic article surveillance tags and/or electronic price labels can be done e.g. with an RFID-reader such as an RFID-gate.

In one embodiment of the invention means for detecting arrival, departure and/or presence of a person to/from a fitting room and means for detecting presence and/or number of remotely readable identification tags, electronic article surveillance tags and/or electronic price labels can be integrated to a same sensor, e.g. planar floor sensor, or same structure or device which is installed e.g. to the fitting area. The sensor can e.g. be a sensor described in WO2009106686-publication. In another embodiment means for detecting arrival, departure and/or presence of a person to/from a fitting room and means for detecting presence and/or number of remotely readable identification tags, electronic article surveillance tags and/or electronic price labels can be separate sensors or devices. E.g. if planar sensor is used it can be used in one embodiment of the invention for only for detecting movement and or presence of a person and in another embodiment also for detecting presence of the remotely readable identification tags, electronic article surveillance tags or electronic price labels and also transfer data between the arrangement and remotely readable identification tags, electronic article surveillance tags or electronic price labels.

In the solution of the invention following steps are performed: detecting entrance or presence of a person to a fitting area or fitting room, detecting presence and/or number of remotely readable identification tags, electronic article surveillance tags and/or electronic price labels in the fitting area or fitting room after the entrance of a person to the fitting area or fitting room detecting departure of a person from a fitting area or fitting room and detecting presence and/or number of remotely readable identification tags, electronic article surveillance tags and/or electronic price labels in the fitting area or fitting room after departure of the person.

In other words when a person enters the fitting room the arrangement is able to detect the entrance of a person and the means for detecting presence and/or number of remotely readable identification tags, electronic article surveillance tags and/or electronic price labels e.g. RFID-reader is activated and it detects the presence and/or number of remotely readable identification tags, electronic article surveillance tags and/or electronic price labels. When person leaves the room the means for detecting presence and/or number of remotely readable identification tags, electronic article surveillance tags and/or electronic price labels is activated again and it detects the presence and/or number of remotely readable identification tags, electronic article surveillance tags and/or electronic price labels. In one embodiment of the invention the arrangement is able to link a certain product having remotely readable identification tag, electronic article surveillance tag and/or electronic price label to a person by using measurement information from means for detecting arrival, departure and/or presence of a person to/from a fitting room and means for detecting presence and/or number of remotely readable identification tags, an electronic article surveillance tags and/or electronic price labels.

In one embodiment of the invention if the number of tags is not the same in both measurements (after entrance, after departure of a person), a notification or an alarm is given.

In one embodiment of the invention if signal to a electronic article surveillance tag is lost a notification and/or alarm can also been given by the arrangement.

In one embodiment of the invention if a person falls or loses consciousness in the fitting room, this can be detected by the presence sensor and a notification or an alarm can be given.

In one embodiment of the invention if another person enters the fitting room while another person is already inside the fitting room, an alarm or a notification can be made.

In one embodiment of the invention the arrangement has a database or connection to a database and it can record to the database how many times certain product and/or certain type, color and/or size of product has been taken into fitting room.

In one embodiment of the invention means for detecting entrance, departure and/or presence of a person in a fitting room can be configured to measure the fitting room and also optionally in proximity of the entrance of the fitting room outside the fitting room. If planar sensors installed to the floor are used, they can be installed to the floor of the fitting room and also optionally in front of the fitting room to make the detection of entrance and/or departure more precise.

FIGS. 2A-C present a schematic and simplified view of an example arrangement of the present invention where one embodiment of the invention is used in the fitting area 200 or fitting space. The fitting area 200 comprises fitting rooms 202, 204, 206 and an entrance area 220 to the individual fitting rooms. In this embodiment means for detecting entrance, departure and/or presence of a person in a fitting room can be arranged to essentially cover the area of whole fitting area 200 including the fitting rooms 202, 204, 206 and the entrance area 220. Means for detecting entrance, departure and/or presence of a person can be e.g. floor sensors or planar sensors arranged on the floor or floor structure. Means for detecting entrance, departure and/or presence of a person can be able to track also movement of a person and to which fitting room the person has moved.

In the embodiment presented in FIGS. 2A-C means for detecting presence and/or number of remotely readable identification tags, electronic article surveillance tags and/or electronic price labels can be arranged as detector gates 208, 210, 212, 222 to the doorways. The detectors can be always activated or they can be activated when a person is approaching the gate or near the gate.

The gate sensor can e.g. monitor how many remotely readable identification tags, electronic article surveillance tags and/or electronic price labels have moved inside to the fitting area or fitting room and how many remotely readable identification tags, electronic article surveillance tags and/or electronic price labels have moved out of the fitting room/area. It's also possible in one embodiment to identify and detect which remotely readable identification tags, electronic article surveillance tags and/or electronic price labels have moved inside the fitting area or fitting room and/or also which remotely readable identification tags, electronic article surveillance tags and/or electronic price labels have moved out of the fitting room. The fitting area may have one doorway and one detector 222 for entering the fitting area 200 at the doorway of the entrance area 220 of the fitting area. The fitting rooms 202, 204, 206 have separate doorways and detector gates 208, 210, 212 can be arranged to doorways of the fitting rooms. The detector gates can be e.g. RFID-detector gates. The doorways can be equipped with e.g. doors and/or curtains.

The arrangement of the invention can function for example in the following way. The person comes to the fitting area through the gate detector 222 and number of products, remotely readable identification tags, electronic article surveillance tags and/or electronic price labels is detected. As the person then moves to the fitting room the sensor gate of the fitting room detects number of products, remotely readable identification tags, electronic article surveillance tags and/or electronic price labels brought to the fitting room. If number of products, remotely readable identification tags, electronic article surveillance tags and/or electronic price labels brought to the fitting room is smaller than number of products, remotely readable identification tags, electronic article surveillance tags and/or electronic price labels detected at the entrance to the fitting area an alarm can be made. When a person leaves through a gate detector of the fitting room and/or fitting area the number of products, remotely readable identification tags, electronic article surveillance tags and/or electronic price labels brought out from the fitting room/area is once again detected. If number of products, remotely readable identification tags, electronic article surveillance tags and/or electronic price labels brought out from the fitting room and/or area is smaller than number of products, remotely readable identification tags, electronic article surveillance tags and/or electronic price labels detected in the fitting room or at the entrance to the fitting area an alarm can be made.

In one embodiment of the invention it's enough that the arrangement only has one means for detecting presence and/or number of remotely readable identification tags, electronic article surveillance tags and/or electronic price labels e.g. a detector gate 222 for the whole fitting area at the entrance of the fitting area.

In one embodiment of the invention an alarm can be made if the number of detected remotely readable identification tags, electronic article surveillance tags and/or electronic price labels which have been brought out of the fitting area or fitting room is smaller than the number of detected remotely readable identification tags, electronic article surveillance tags and/or electronic price labels which have been brought in to the fitting area or fitting room.

In one embodiment of the invention the arrangement can indicate whether the fitting room is free or occupied. This can be done e.g. with signaling lights 214, 216, 218, 232 like presented in FIGS. 2B and 2A. There can be separate signaling lights 214, 216, 218, for fitting rooms and separate signaling light for entrance area 220 and/or the whole fitting area 200. In one embodiment of the invention the arrangement can indicate what the estimated time is when a fitting room and/or the next fitting room is available.

In one embodiment of the invention if the signal of the remotely readable identification tag, electronic article surveillance tag and/or electronic price label has disappeared when present in the fitting room, the arrangement can perform an alarm at the cashier because the price label is linked with the electronic article surveillance tag and/or electronic price label. In one embodiment of the invention also if a person has had more products in the fitting room than which he has brought out of the fitting room (leaving product, remotely readable identification tag, electronic article surveillance tag and/or electronic price label to the fitting room), an alarm can be made at the cashier because the system is able to record and check which products have been at the same time in the same fitting room and missed items left to the fitting room have been linked to the product(s) brought to the cashier.

In one embodiment of the invention the arrangement can identify the product to which remotely readable identification tag, electronic article surveillance tag and/or electronic price label is attached. The arrangement can identify the type, color, size and/or other feature of the product to which the remotely readable identification tag, electronic article surveillance tag and/or electronic price label is attached. With this information it's possible to gather information which products, sizes and/or colors have been tried on by persons in the fitting room. It's also possible to get relationship between the fittings done to the products sold (e.g. different colors, sizes and/or combination of cloths). E.g. if products are sold well, the arrangement is able to tell with which clothes it has been tried on or fitted. Also if product is not selling well it's possible to see whether it has been fitted or not. Also if price of certain products are changed it can be monitored how this change in price affects to how many products have been sold and/or fitted.

In one embodiment of the invention if the arrangement is able to detect which clothes the person is trying on (or having) in the fitting room it can inform the person e.g. via a display, which products are compatible and would suit well with the products present in the fitting room. The arrangement can also inform the person which sizes are available for which products and/or e.g. present only products with similar kind of sizes to the products present in the fitting room. In one embodiment of the invention the person in the fitting room could also order products (and optionally with certain size) to the fitting room by using the display. In one embodiment of the invention the display could show the individual prices of the products present in the fitting room and/or the overall price of all products present in the fitting room. In one embodiment of the invention the display could suggest a related product to the person in the fitting room based on products present in the fitting room and/or ongoing sale promotions. E.g. during "the more you buy the less you pay"-type of promotion the display could inform how much money could be saved because of the sales promotion if the person would add a new product to the items to be bought by him/her. In one embodiment if the total sum/overall price of all products in the fitting room is above a predefined limit, a notification is made for the personnel of the store so that the personnel could offer assistance to a person in the fitting room. In these embodiments the second measurement of number or presence of electronic article surveillance tags or electronic price labels after the person has left the fitting room is only optional (i.e. detecting departure of a person and presence and/or of electronic article surveillance tags or electronic price labels after departure are not needed to be performed but they can be performed).

In one embodiment of the invention the arrangement detects e.g. with means for detecting arrival, departure and/or presence of a person to/from a fitting room, that a person has entered the fitting room and based on this detection cooling and/or ventilation for the fitting room is switched on. When the arrangement detects, e.g. with the means for detecting arrival, departure and/or presence of a person to/from a fitting room, that the person has left the fitting room, cooling and/or ventilation for the fitting room is switched off.

In the premises where the arrangement of the invention is installed also electronic article surveillance system can be used. The electronic article surveillance system can comprise at least one detection means configured to detect electronic article surveillance tags. Detection means can be e.g. gate alarms, security ports or other kind of detectors which are able to detect electronic article surveillance tags. The electronic article surveillance system can be a radio-frequency based system and electronic article surveillance tag can be a radio-frequency tag such as an RFID-tag. The arrangement of the present invention can comprise electronic article surveillance system or it can be linked or used with an electronic article surveillance system for performing alarms or notifications.

The electronic article surveillance system can be configured to give an alarm signal if an active electronic article surveillance tag is detected by the detection means from the area where the detection means are able to detect the presence of an active electronic article surveillance tag.

In one embodiment the electronic article surveillance system comprises security ports and alarm signal is given based on the response from security ports when active electronic article surveillance tag is exported through the security port. The alarm can be made in this case if the electronic article surveillance tag is exported through the port.

The arrangement of the invention can be used with products having only an electronic article surveillance tag, only an electronic price label and/or both an electronic article surveillance tag and an electronic price label. If the product has both an electronic article surveillance tag and an electronic price label, these can be integrated into one structure or they can also be arranged to different and separate structures such as tags. One advantage of an integrated solution is that only one item has to be attached to the product and handled by the personnel of the store.

In the solution of the invention where electronic price labels are used, electronic price labels can be attached to the products 301 such as clothes such that they are easily perceivable for the customers. An example embodiment of the electronic price label is presented in FIG. 3. Electronic label tag 300 can have attachment means (not shown in FIG. 3) by which the electronic label tag 300 can be attached to products. Also external attachment means can be used to attach the electronic label tags to products. External attachment means can be e.g. pins, loops or at least partly transparent pockets.

FIG. 4 presents an example embodiment of an electronic price label 400. The electronic price label 400 has a layered structure. It consists essentially of a flexible e-paper display 401 comprising e-paper display material, a backplane layer 403 as a flexible circuit board having an electrode structure for controlling the display, a battery 407, which can be substantially rigid or flexible, and wherein the thickness of said battery is greater than the thickness of said flexible display layer 401 and the thickness of said flexible backplane layer 403, and a resilient layer 408 having a cut-out space for said battery 407, wherein said resilient layer 408 is arranged to provide a substantially even total thickness of said label.

Electronic price labels have an electronic display which can be updated by an electronic price label system. Furthermore, the electronic price label system comprises at least a central processing unit connected to a base station or other communication means, via which it is possible to transmit, for example, updated price information and other control information to the electronic price label.

The electronic price labels communicate in a wireless manner with the base station. Wireless communication method may be based on any known wireless communication technology, but in order to save battery life of the electronic price labels, passive backscatter radio communication is preferred. In this approach the base stations actively send radio signals and instead of answering with active radio transmission, the electronic price label do not use a radio transmitter; instead, they answer by modulating the reflected power of the base station signal. The modulation is achieved, typically, by changing the load state of the antenna in the electronic price label, for example, by connecting and disconnecting the antenna between the ground and non-ground potential. This modulation of the backscattered signal allows for the electronic price label to answer to the base stations and further to the store level server. The system can be configured to use certain frequency band for communication between electronic price labels and base station(s), e.g. 868 MHz frequency band, 2.4 GHz frequency band or any other frequency band allowed to be used for an electronic price label system. In one embodiment of the invention the system can use multiple frequency bands for communication between electronic price label and base station(s) and/or different kind of diversity techniques. Electronic price label can use its antenna or one of its antennas for communicating with the base station with backscatter radio communication.

Each electronic price label can be identified by its own identification code for electronic price label system that the electronic price label in question knows to listen for in the transmission from the base station. After receiving new information, instructions or commands from the store server via base station, the electronic price label can acknowledge the reception of these instructions by using the reflected backscattering modulated properly and timely for the store level server to identify that the response is coming from the electronic price label in question. To facilitate that the store server may have a certain listening period after a transmission directed to a certain electronic price label for giving the module possibility to answer during that time.

In one embodiment of the invention communication module can comprise an active radio transmitter instead of backscatter radio communication means. In this embodiment the radio transmitter is preferably low power RF-transmitter or transceiver.

Information stored to electronic price labels and communication between the electronic price labels and base stations can be encrypted.

Also energy harvesting methods may be used to provide energy to the electronic price label, such as solar or photovoltaic cells. Also capacitors, such as electric double-layer capacitors, i.e. supercacitors, can be used instead or with the battery. In one embodiment of the invention the energy source, such as battery, of the electronic price label can be changed. In one embodiment of the invention the electronic price label has an opening e.g. in the back side of the electronic price label, via which the energy source can be removed from the electronic price label and inserted to the electronic price label.

The display is arranged to display the information related to the product. Also other product information can be added to electronic price label such as name of the product, logo and/or some other information relating to the product. The information which is in the display can be e.g. price, sale price and/or discount.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192. Instead of segment display type, the display type can also be pixel type display.

The electronic price label further comprises wireless communication capabilities with at least one antenna 402 consisting of any shape e.g. two triangular antenna patterns on the same flexible circuit board as the display control, as the electronic price label module is implemented as semi-active RF tags that is powered from incident RF communicating via modulated backscatter, and a separate flexible circuit board. The electronic price label is configured to communicate with the antenna 402 with electronic price label system and electronic article surveillance system.

The battery 407 has been encapsulated in a cut-out space by laminating said display 401, backplane 403, control circuit board and resilient layers 408 together. Further, the display layer 401, the backplane layer 403, the resilient layer 408 and the battery 407 are located between two outside protective layers (not shown) forming a body of the electronic price label for an electronic price label suitable to be attached to a product. Also a protective layer 406 can be arranged at the bottom of the backplane layer 403 to prevent moisture from getting to display layer 401 which is sensitive to moisture variations. The rigid component has been attached to the separate flexible printed circuit board 409 operating as a sub module under the backplane and the antenna. Backplane layer 403 as a flexible circuit board having an electrode structure for controlling the display and separate flexible printed circuit board 409 can be considered to form control electronics of the electronic price label.

The backplane and the antenna circuit board 403 and the electronic price label control circuit board are patterned plastic films (PET or PC or PVC or polyimide) with patterned conductive copper layers. The forming and patterning of the conductors can be made using any method known as such for a person skilled in the art, for example by direct printing of conductive ink or by etching of a thin metal layer. The lower surface of the backplane 403 has display segment lead lines patterned in a similar way. Each display segment is electrically connected to a corresponding display segment lead line for example through a preferably laser processed via. Also other ways of providing feed-through vias are possible as is evident for a person skilled in the art. In order to establish an electrical contact from the back-plane segments to the display front electrode, which is in this example on the front surface of the flexible electronic display web, an electrically conducting tape 405 is laminated on the backplane area acting as a front electrode feed line. Alternatively and instead of an electrically conducting tape 405, electrically conducting paste or similar material with adhesive nature may be dispensed on the backplane web to make contact with the front plane electrodes.

It's also possible to add further layers 404 to change the visual appearance of the electronic price label or to protect the electronic price label.

The electronic price label can have multiple memory locations for the information, for example for price information. The electronic price labels can also comprise multiple different views stored in the memory locations i.e.

different pages that include different information to be displayed. Staff can have its own pages which can be displayed only with a special staff equipment. Also loyalty customers or other group of users can have own pages which can be activated using e.g. loyalty card. E.g. Loyalty Card holders can have special price displayed for them when loyalty card is brought close to the electronic price label.

In one embodiment of the invention the electronic price label comprises an electronic article surveillance part, e.g. a tag, which can be detected by an electronic article surveillance system. This kind of electronic price label can always respond to the query of the detection means of the electronic article surveillance system and this way an alarm can always be generated reliably when active electronic article surveillance part is in the range of the detection means.

In the embodiment where the electronic price label comprises an electronic article surveillance part, the electronic price label can comprise two integrated circuits, e.g. ASICs or microprocessors, which first integrated circuit is configured to control the communication module for receiving information from base station related information and the second integrated circuit is configured to control the electronic article surveillance part. The integrated circuits can be connected to each other and they can send information to each other. They can also switch off and on each other. If one receives information it can forward it to another integrated circuit.

In one embodiment of the invention detecting arrival, departure and/or presence of a person to/from a fitting room/area and/or detecting departure of a person from a fitting room/area is not necessary. In this embodiment it's enough that only the presence, type and/or number of remotely readable identification tags, electronic article surveillance tags and/or electronic price labels is detected to be able to carry out functions enabled by the invention such as alarm features, gathering information about products, sizes and/or colors which have been present in the fitting area and/or fitting room, and/or informing customers about products present in the fitting room.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention. Embodiments described in the description in combination with other embodiments can be also used as separate embodiments.

The invention claimed is:

1. An arrangement for fitting rooms and/or fitting areas, comprising:
   a first sensor for detecting arrival, departure and/or presence of a person to/from a fitting room and/or fitting area and second sensor for detecting presence and/or number of remotely readable identification tags, electronic article surveillance tags and/or electronic price labels in the fitting room and/or fitting area,
   wherein the arrangement is configured to:
   detect entrance or presence of a person to the fitting room and/or to fitting area,
   detect presence and/or number of remotely readable identification tags, electronic article surveillance tags and/or electronic price labels in the fitting room and/or the fitting area after the entrance of a person to the fitting room and/or fitting area,
   detect departure of a person from a fitting room and/or fitting area, and
   detect presence and/or number of remotely readable identification tags, electronic article surveillance tags and/or electronic price labels in the fitting room and/or fitting area after departure of the person,
   wherein the first sensor for detecting arrival, departure and/or presence of a person comprises at least one sensor for detecting presence and/or movement of a person at certain area, and
   wherein the first sensor for detecting arrival, departure and/or presence of a person is a movement sensor, an infrared sensor, a planar sensor and/or a floor sensor.

2. An arrangement according to claim 1 wherein the arrangement is further configured to compare the number of detected remotely readable identification tags, electronic article surveillance tags and/or electronic price labels to the measurement made after entrance of a person to the fitting room and/or fitting area.

3. An arrangement according to claim 1 wherein the arrangement is further configured to perform a notification or an alarm if number of remotely readable identification tags, electronic article surveillance tags and/or electronic price labels is higher after the person has left the fitting room and/or fitting area than it was when the person was in the fitting room and/or fitting area.

4. An arrangement according to claim 1 wherein the arrangement is further configured to perform a notification or an alarm if the persons leaves the fitting room and/or fitting area but the remotely readable identification tag, the electronic surveillance tag or the electronic price label can be still detected from the fitting room and/or fitting area.

5. An arrangement according to claim 1 wherein the remotely readable identification tag, the electronic article surveillance tag and/or electronic label is radio frequency tag such as an RFID-tag.

6. An arrangement according to claim 1 wherein the second sensor for detecting presence and/or number of a remotely readable identification tag, electronic article surveillance tags and/or electronic price labels is a gate detector, radio frequency tag reader such as an RFID-tag reader or an RFID-gate.

7. An arrangement according to claim 1 wherein the arrangement is configured to identify a product to which remotely readable identification tag, electronic article surveillance tag and/or electronic price label is attached.

8. An electronic article surveillance system wherein it comprises an arrangement according to claim 1.

9. An electronic price label system wherein it comprises an arrangement according to claim 1.

10. An electronic price label system according to claim 9 wherein it further comprises an electronic article surveillance system.

11. A method for detecting electronic article surveillance tags and/or electronic price labels in fitting room and/or fitting area with an arrangement, wherein
   the arrangement comprises a first sensor for detecting arrival, departure and/or presence of a person to/from a fitting room and/or fitting area and a second sensor for detecting presence and/or number of remotely readable identification tags, electronic article surveillance tags and/or electronic price labels in fitting room and/or fitting area, wherein in the method comprises:
   detecting entrance or presence of a person to a fitting room and/or fitting area,
   detecting presence and/or number of remotely readable identification tags, electronic article surveillance tags and/or electronic price labels in the fitting room and/or fitting area after the entrance of a person to the fitting room and/or fitting area, detecting departure of a person from a fitting room and/or fitting area, and detecting presence and/or number of remotely readable identification tags, electronic article surveillance tags and/or electronic price labels in the fitting room and/or fitting area after departure of the person, wherein the first sensor for detecting arrival, departure and/or presence of a person comprises at least one sensor which detects presence and/or movement of a person at certain area, and wherein first sensor for detecting arrival, departure and/or presence of a person is a movement sensor, an infrared sensor, a planar sensor and/or a floor sensor.

12. A method according to claim 11 wherein the arrangement is further configured to compare the number of detected remotely readable identification tags, electronic article surveillance tags and/or electronic price labels to the measurement made after entrance of a person to the fitting room and/or fitting area.

13. A method according to claim 11 wherein the arrangement is further configured to perform a notification or an alarm if number of remotely readable identification tags, electronic article surveillance tags and/or electronic price labels is higher after the person has left the fitting room and/or fitting area than it was when the person was in the fitting room and/or fitting area.

14. A method according to claim 11 wherein the arrangement is further configured to perform a notification or an alarm if the persons leaves the fitting room and/or fitting area but remotely readable identification tags, electronic surveillance tag or electronic price label can be still detected from the fitting room and/or fitting area.

15. A method according to claim 11 wherein the remotely readable identification tag, the electronic article surveillance tag and/or the electronic label is radio frequency tag such as an RFID-tag.

16. A method according to claim 11 wherein the second sensor for detecting presence and/or number of remotely readable identification tags, electronic article surveillance tags and/or electronic price labels is a gate detector, radio frequency tag reader such as an RFID-tag reader or an RFID-gate.

17. A method according to claim 11 wherein the method further comprises identifying a product to which remotely readable identification tag, electronic article surveillance tag and/or electronic price label is attached.

18. An electronic article surveillance system according to claim 8 wherein it further comprises an electronic price label system.

* * * * *